United States Patent
Pletcher et al.

(10) Patent No.: US 6,172,492 B1
(45) Date of Patent: Jan. 9, 2001

(54) FIXED OFF TIME AND ZERO VOLTAGE SWITCHING DUAL MODE POWER FACTOR CORRECTING CONVERTER

(75) Inventors: Timothy Allen Pletcher, Eastampton; Robert Amantea, Manalapan, both of NJ (US); Min-Sung Yang, Seoul (KR); Heon-Kyu Kim, Kyunggi-Do (KR); Jae-Hong Joo, Kyunngi-Do (KR); Bok-Man Kim, Kyunngi-Do (KR)

(73) Assignees: Sarnoff Corporation, Princeton, NJ (US); Daewoo Electronics Co., Ltd., Seoul (KR)

( * ) Notice: Under 35 U.S.C. 154(b), the term of this patent shall be extended for 0 days.

(21) Appl. No.: 09/515,879

(22) Filed: Feb. 29, 2000

Related U.S. Application Data

(60) Provisional application No. 60/126,525, filed on Mar. 26, 1999.

(51) Int. Cl.[7] .................................. G05F 1/44; H02H 7/10
(52) U.S. Cl. .............................. 323/284; 323/351; 363/50
(58) Field of Search ...................................... 323/235, 271, 323/276, 283, 284, 285, 288, 319, 351; 363/50, 56, 131

(56) References Cited

U.S. PATENT DOCUMENTS

| | | | |
|---|---|---|---|
| 5,663,874 | * 9/1997 | Mader et al. | 363/131 X |
| 5,747,972 | * 5/1998 | Baretich et al. | 323/283 X |
| 5,867,379 | * 2/1999 | Maksimovic et al. | 363/89 |

* cited by examiner

Primary Examiner—Jessica Han
(74) Attorney, Agent, or Firm—WIlliam J. Burke

(57) ABSTRACT

A dual mode converter is provided that may be operated as a variable-frequency, naturally-commutated controller in a Zero-Voltage-Switching mode and as a fixed-off-time controller in a Fixed-Off-Time mode. The converter includes four functional elements. A reference and biases element generates voltage references and biases utilized to determine various signal states. A Timing element generates a fixed off time signal and a voltage ramp signal utilized to create the dual modes of operation. A Catastrophic-Event element detects events that cause the converter output be inhibited and the controller to be restarted. A Mode Detection and Pulse Width Modulation element determines the mode of operation for the converter based on signal inputs from the other functional elements and modulates the output accordingly. In a primary mode, the controller utilizes variable frequency operation to deliver primary power. In a standby mode, the controller utilizes fixed frequency operation to provide low power (less than 5W).

12 Claims, 2 Drawing Sheets

FIXED OFF TIME AND ZERO VOLTAGE SWITCHING DUAL MODE POWER FACTOR CORRECTING CONVERTER

This Application claims the benefit of U.S. provisional application Ser. No. 60/126,525 filed Mar. 26, 1999.

FIELD OF THE INVENTION

The invention relates generally to power supplies for electronic devices, and more particularly to a controller for a switching power converter.

BACKGROUND

Regulated power supplies are found in virtually all electronic devices, including battery chargers, cellular telephones, computers, computer monitors, televisions, audio equipment, and video cameras. One typical power supply, the DC to DC converter, operates from a DC source, generates an alternating current as an intermediate process, and delivers direct current to a load. Switched DC converters, like linear, transformer-based power supplies, deliver regulated output and provide isolation between input and output circuits. Unlike a linear power supply, however, the transformers in a switched DC converter operate at much higher frequencies, frequencies as high as several megahertz. Such operation permits the use of small value components, including transformers and capacitors, while still providing for complete isolation between the input and the output of the converter.

Although widely used in electronic and computer applications, switched DC converters are known to introduce radiated losses and RF noise during switching. In hard-switching topologies for example, switching causes a rapid transition in the current through or voltage across the converter's switch and results in switching losses in the form of signal emissions. These switching transients have a spectrum containing high frequency components, appear as radiated emissions, and introduce noise into the area surrounding the converter. Such noise may interfere with video signals or the like, thus requiting additional processing and filtering of transmitted signals to obtain a more useful, noise-free form.

Soft-switching converters present a known converter topology for reducing hard switching losses and associated noise-related problems. A typical soft-switching converter utilizes a resonator to force either the current or voltage in a power switch to zero during switching. This action significantly reduces switching transients and radiated emissions caused by rapid transitions in the switching current and/or voltage.

Soft-switching converters, however, also fail to achieve optimum efficiency. For example, in a display device, the regulated power supply typically operates in various modes. In a primary mode, all the components of the display monitor are powered, and collectively dissipate between 50 W and 100 W in displaying screen images which range from all black to all white. In a standby mode, a minimal number of display monitor components, such as the power supply, microprocessor and remote control circuitry, are powered. Standby mode has a constant load characteristic that typically consumes less than 5 W. In a suspend mode, an intermediate mode between the primary and standby modes, several but not all components of the display monitor are active. Approximately 10 W to 20 W are dissipated by a display device in the suspend mode.

To provide low power operation (less than 20 W), typical soft-switching power supplies reduce their switching frequency, since only a small amount of power must be delivered to a load. This method of providing low power results in erratic feedback for the zero voltage switching detection unit, and introduces an unacceptable power loss in the switch of such a power supply. In addition, typical soft-switching power supplies suffer intolerable constraints in the range of power available for delivery in low power operating modes.

SUMMARY OF THE INVENTION

A power supply according to the principles of the invention provides for low cost, low noise, and high-efficiency performance with improved power factor correction, and a low power standby mode of operation. To achieve this performance, a converter according to the principles of the invention operates as a variable frequency, naturally commutated controller or as a fixed off-time controller. In a primary mode, the converter is operated as a variable frequency controller to deliver the primary power. In a standby mode, the converter is operated as a fixed off-time controller to provide low power (less than 5 W).

The dual mode converter of the invention (a/k/a 'controller' referring to control of the operation of the converter) includes four main elements. A Reference-and-Biases element generates voltage references and biases utilized by the controller to determine the state of various signals. A Mode-Detection-and-Pulse-Width-Modulation element determines from the various signal states whether the converter is to operate in a Fixed-Off-Time mode or a Zero-Voltage-Switching (ZVS) mode. A Timing-Circuit produces a fixed-off-time signal and a voltage-ramp signal, which are utilized by the controller to create the dual modes of operation. A Catastrophic-Event element shuts off the output of the converter and forces the controller restart upon the occurrence of a catastrophic event.

BRIEF DESCRIPTION OF THE DRAWINGS

A more complete understanding of the present invention may be obtained from consideration of the following description in conjunction with the drawings in which.

DETAILED DESCRIPTION

A power supply controller according to the principles of the invention provides for high efficiency, low noise and a strongly regulated output. The invention improves the power factor performance of power supplies implemented utilizing quasi-resonant, zero voltage switching (QR-ZVS) flyback topologies. The resulting power supply is suitable for use with a wide range of electronic devices, including televisions, computer monitors, personal computers, cellular telephones, communications equipment, audio equipment, radar and other like equipment.

The power supply for a commercial display device, such as a TV or a computer monitor, has two basic modes of operation. In a primary mode, power is supplied as a number of fixed DC output voltages to various circuit elements such as amplifiers and processing circuits. Loads in the primary mode are highly dynamic and sensitive to output voltage fluctuations. Thus, excellent line and load regulation is required for proper operation of a display device. A second mode of operation is known as standby mode. In standby mode, a very small amount of power, typically less than 5 W, is consumed. In this mode, the power supply powers a microcontroller and other "always-on" circuitry, such as the remote control circuitry included with most TVs. The standby mode can be considered as having a constant load.

The invention provides the control of a switching converter (i.e., power supply) that utilizes a quasi-resonant, zero voltage switching (QR-ZVS) topology. The controller includes signal processing and control circuitry to provide operation as both a variable-frequency and a fixed-frequency switched mode converter. The combination of variable frequency operation (i.e., zero voltage switching) and voltage mode control operation provided by the controller allows for implementation of a power factor correction methodology. The resultant dual-mode converter provides an extended range of control, accommodating the wide load range typically experienced in modern electronic devices. Variable frequency operation is used while delivering the primary power in the primary mode and the fixed-off-time operation is used for power delivery in the standby mode. The converter also includes additional circuitry that detects and prevents catastrophic circuit operation.

PFC Controller State Diagram

Figures 1, 2:
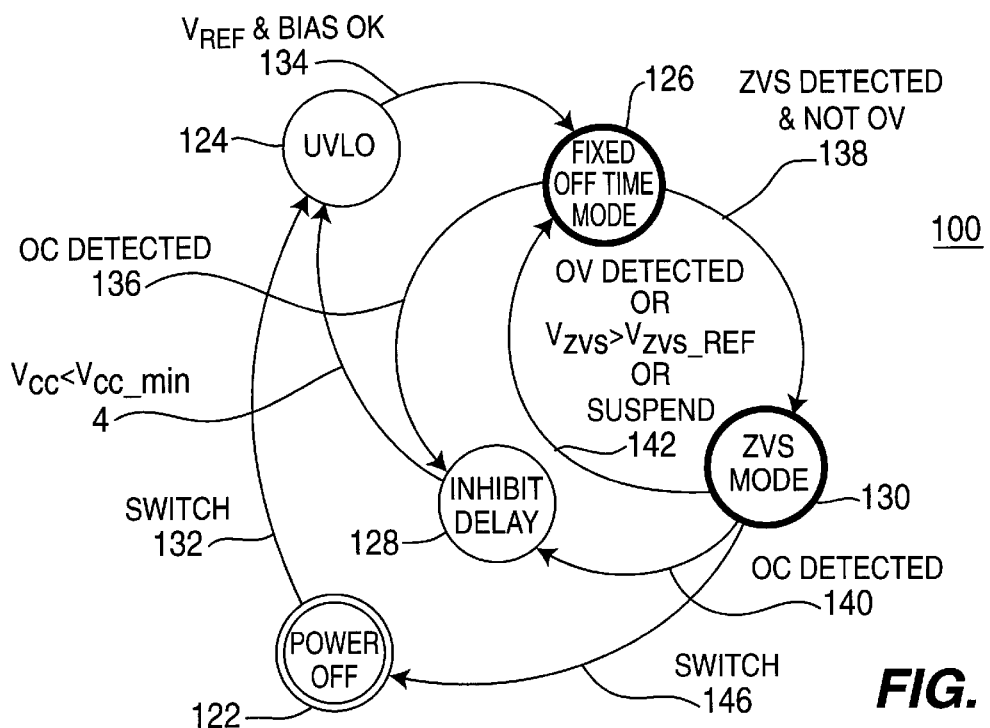
FIG. 1 is a state diagram for a power factor correcting controller according to the principles of the invention.
FIG. 2 is a functional block diagram for a power factor correcting controller according to the principles of the invention.

FIG. 1 is a state diagram 100 illustrating the various circuit states and modes of operation for a power factor correcting controller according to the principles of the invention. Those states and modes of operation include: a Power-Off state 122, an Under-Voltage-Lock-Out (UVLO) state 124, a Fixed-Off-Time mode of operation 126, an Inhibit-Delay state 128, and a Zero-Voltage-Switching (ZVS) mode of operation 130. Arrows in FIG. 1 indicate events and their corresponding conditions that cause the controller to transition from one state or mode of operation to another state or mode of operation as described below.

Initially, the controller is in the Power-Off state 122. Closing a switch (arrow 132) causes the controller to exit the Power-Off state 122 and begin operation. Upon the switch closing (e.g., connection of the converter to a voltage source), power is applied to the controller, which enters the UVLO state 124. While in the UVLO state, voltage references and biases are established. The UVLO state 124 is essentially a waiting period that ensures that the controller circuit is in a stable state prior to beginning regulation.

When the input voltage powering the controller exceeds a threshold ($V_{CC} \times V_{CC\_MIN}$) and other voltage references and biases have stabilized ($V_{REF}$-&-Biases OK (arrow 134)), the controller leaves the UVLO state 124 and enters the Fixed-Off-Time mode of operation 126. In the Fixed-Off-Time mode, the controller begins to deliver power to the controller output. The Fixed-Off-Time mode is maintained until the occurrence of either of two events. In a first event, if an Over-Current condition is detected (OC Detected (arrow 136)), the controller leaves the Fixed-Off-Time mode 126 and enters the Inhibit-Delay state 128. In the second event, if the controller detects a Zero-Voltage-Switching condition (ZVS Detected) and the absence of an Over-Voltage condition (Not OV) (arrow 138), the controller leaves the Fixed-Off-Time mode 126 and enters the ZVS mode of operation 130.

The Inhibit-Delay state 128 is a catastrophic recovery state that is entered when an Over-Current condition is detected (arrows 136 and 140) during controller operation in the Fixed-Off-Time mode 126 or ZVS mode 130. Usually an Over-Current condition indicates a short circuit in either the power supply or one of its loads. The occurrence of the Over-Current condition, which is detected by sensing the primary switching current, causes the controller to enter the Inhibit-Delay state and thereby disables the controller from delivering power. From the Inhibit-Delay state 128, the controller is forced into the UVLO state 124 when the input voltage to the controller falls below a threshold voltage ($V_{CC} < V_{CC\_MIN}$ (arrow 144)).

In the ZVS mode 130, the controller operates as a variable-frequency, naturally-commutated converter. The ZVS mode typically operates at high switching frequencies (i.e. >30 Khz), and delivers full power to the output loads. The ZVS mode is maintained until the occurrence of either of three events. In a first event, if an Over-Current condition is detected (OC Detected (arrow 140)), the controller leaves the ZVS mode 130 and enters the Inhibit-Delay state 128. In a second event, the controller leaves the ZVS mode of operation 130 and reenters the Fixed-Off-Time mode of operation 126, if an Over-Voltage condition is detected (OV Detected) or the Zero-Voltage-Switching condition is no longer detected ($V_{ZVS} > V_{ZVSREF}$) or a voltage input signal forcing the controller into the Fixed-Off-Time mode of operation is applied (SUSPEND sensed) (arrow 142). The controller also exits the ZVS mode 130 and reenters the Power-Off state 122 upon the opening of the switch (arrow 146).

The Fixed-Off-Time mode 126 is utilized to provide power for the standby mode, which is typically low power operation. The ZVS mode of operation is utilized to deliver primary power in the primary mode. The Power-Off state 122 is marked by the absence of power delivery to the converter of the invention (i.e., disconnection of the converter from a voltage source).

PFC Controller Functional Block Diagram

A functional block diagram 200 for a controller according to the principles of the invention is illustrated in FIG. 2. The power factor correcting converter according to the principles of the invention, which provides such voltage mode control and variable frequency operation, may be implemented by four functional elements. A Voltage-Reference-and-Biases ($V_{REF}$-&-Biases) element 220 generates internal voltage references and biases 202 utilized by the controller to determine the state of various external signals 204. A Mode-Detection-and-Pulse-Width-Modulation (MD-&-PWM) element 206 determines from external signals 204 and internal references 202 whether the controller is to operate in the Fixed-Off-Time mode or ZVS mode in order to supply voltage output, OUT 234. A Timing-Circuit 260 produces a Fixed-Off-Time signal and a Voltage-Ramp signal 208, which the controller uses to create the dual modes of operation. In the Fixed-Off-Time mode, the output of the converter is modulated according to the oscillation frequency of the off-time signal. In the ZVS mode, the output of the converter is modulated according to a signal that indicates when all the energy stored in the converter has been discharged into the load. A Catastrophic-Event element 290 senses external signals 204 and internal references 202, and, upon the detection of a catastrophic event, disables the controller output and forces the controller to restart.

Power factor is a measure of real to apparent power. In sinusoidal circuits, power factor is the measure of the fraction of current in phase with the voltage and contributing to the average power. In a classic reactive load such as a typical switching power supply, a bridge rectifier feeds a capacitor, and so particularly at partial load, draws current at the peak of the input voltage when the instantaneous line voltage is above the capacitor voltage. The current drawn through the rectifier is in-phase with the voltage but is non-sinusoidal so that the power factor is not near unity. The converter of the invention accomplishes a measure of power factor correction by reducing the value of the filter capacitor in the rectifier circuit such that there is little energy storage at the fundamental frequency at the input. Additional power factor correction is achieved (i.e., power factor increased) by modulating the switching current proportional to the input voltage to the power supply. Assuming a rectified sinusoidal waveform for the input voltage and a constant load, the rectifier circuit described will generate a switching current that is sinusoidal and in phase with the input voltage at the frequency of the input voltage.

Typically though, the load on a power supply varies over time. Therefore, in order to place voltage and current in-phase while satisfying a varying load, the converter of the invention utilizes a pulse-width-modulation. Pulse width modulation attempts to satisfy a varying load by varying the current inverse to the voltage to provide constant power at a fixed frequency to the load. The ZVS mode of the converter of the invention supplies such a varying load.

The converter of the invention combines the voltage mode control described in the state diagram of FIG. 1 and self-commutating method of switching to provide power factor correction through variable frequency modulation. Voltage mode control enables sampling of the input voltage to which variable frequency operation is applied. By varying the frequency of the output with the load and limiting the bandwidth of the control loop to a frequency less that the input line frequency, a constant duty cycle across one cycle of sampled input can be provided. Zero voltage switching implements variable frequency operation and maintains the output voltage at a constant level.

PFC Controller Architecture

Figure 3:
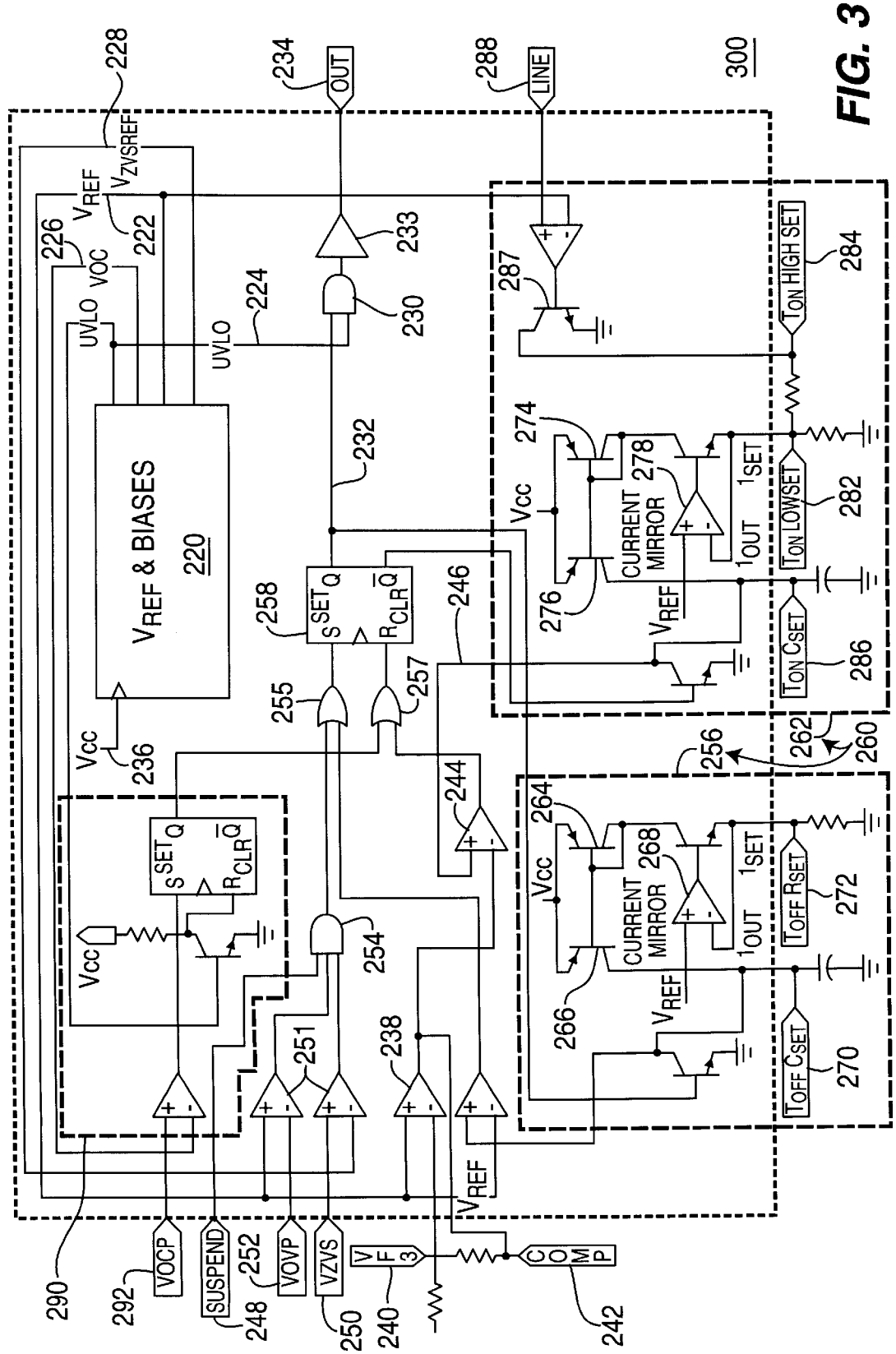
FIG. 3 illustrates a schematic representation of an exemplary controller according to the principles of the invention that implements the functions of the state diagram of FIG. 1.

A schematic representation 300 of an exemplary controller according to the principles of the invention, which implements the state diagram of FIG. 1, is illustrated in FIG. 3. It should be apparent to one of ordinary skill in the art that the schematic of FIG. 3 is merely exemplary. Circuits implementing the functional elements of the invention and having various components, component values, voltages, and voltage references may be utilized without departing from the principles of the invention.

The controller 300 has four main functional elements. The Voltage-Reference-and-Biases ($V_{REF}$-&-Biases) element 220 includes circuitry that generates a temperature stable voltage reference ($V_{REF}$ 222) and other voltage references for comparison to signals, and a comparator with built-in hysteresis that is used to generate an Under-Voltage-Lock-Out signal, UVLO 224. Voltage references generated by the $V_{REF}$-&-Biases 220 element include a Voltage-Over-Current reference (VOC 226) and a Zero-Voltage-Switching-Voltage reference ($V_{ZVSREF}$ 228). The UVLO signal is an internal reset signal that inhibits operation of the converter until the voltage references and biases are stable. The UVLO signal 224 is gated to an AND gate 230 along with the voltage generated by the controller 232 and thus can prevent the Output signal (OUT 234) from driving a power switch (not shown) needed to deliver power. The output signal is conditioned by amplifier 233. The Output signal 234 is a low impedance, high-speed voltage output used to drive a power semiconductor switch. The $V_{REF}$-&-Biases element 220 is supplied with $V_{CC}$ 236, which represents the power input to the controller, upon the closing of a switch (not shown).

The second main element of the circuit is the Mode-Detection-and-Pulse-Width Modulation (MD-&-PWM) circuit. The MD-&-PWM circuit includes an error amplifier 238, a high-speed comparator 244, a SR flip-flop 258, two OR gates 255 and 257, and a three-input AND gate 254. This portion of the circuit is the core of converter control. Error amplifier 238 compares the feedback-voltage, VFB 240, to the internally generated voltage-reference, $V_{REF}$ 222. The VFB voltage sense signal 240 is connected to the inverting input of an error amplifier 238 and is a representation of the secondary voltage/s to be regulated. An error signal (COMP 242) produced by the error amplifier 238 sets a voltage level that is then compared by the high-speed comparator 244 to a voltage ramp signal 246 synchronized to the output signal, OUT 234. The level of the error signal will intersect the Voltage-Ramp signal at different amplitudes thereby modulating the pulse-width of the output signal, OUT 234. The output pulse width varies while the off-time remains fixed, resulting in a variable frequency output. The output of the error amplifier, COMP 242, is also fed back to the error amplifier to compensate the frequency response of the control loop.

The varying output pulse-width of the high-speed comparator 244 of the MD-&-PWM functional element varies the power delivered to the controller loads. The frequency at which the output of the comparator is modulated is determined by the signals SUSPEND 248, $V_{ZVS}$ 250, VOVP 252, and the output signal of the off-time timing circuit 256. SUSPEND 248 is a voltage input signal that forces the controller into the fixed off-time mode of operation. $V_{ZVS}$ 250 is a voltage sense signal that is used to create the variable-frequency mode-of-operation. The $V_{ZVS}$ signal is derived from a resonant oscillation indicating that the energy stored in the transformer has been completely discharged into the load. VOVP 252 is a voltage sense signal used to indicate an over-voltage condition of the secondary voltages. $V_{ZVS}$ 250 and VOVP 252 are compared by error amplifiers 251 to the Zero-Voltage-Switching-Voltage-reference, $V_{ZVSREF}$ 228, and stable voltage reference, $V_{REF}$ 222, respectively, as provided by the $V_{REF}$-&-Biases functional element 220. The output of such error amplifier comparison along with the SUSPEND signal 248 are supplied as inputs to a three-input AND gate 254. The output of the three-input AND gate 254 and the fixed off-time circuit 256 are supplied through a first OR gate 255 to the set input of SR flip-flop 258 and determine the mode of operation of the controller.

If SUSPEND 248 is low or VOVP 252 exceeds the internal voltage reference, $V_{REF}$ 222, the frequency of modulation is determined by the oscillating frequency of the off-time timing circuit 256. This condition indicates the Fixed Off-Time mode of operation. If SUSPEND 248 is high and VOVP 252 is less than $V_{REF}$ 222, then the frequency of modulation is determined by the input signal, VZVS 250. This condition indicates ZVS mode of operation. $V_{ZVS}$ 250 is a signal derived from the flyback topology and is used to indicate that all energy stored in the transformer has been discharged into the secondary loads. For proper circuit operation, the frequency of $V_{ZVS}$ should be much higher than the programmed frequency of the off-time timing circuit. During operation of the converter, power is modulated by varying the pulse width of the output. If and as the input voltage or output voltage varies, the off-time is modulated.

If the input voltage or output voltage are fixed, varying pulse-width varies the frequency of the output.

The third main functional element 260 of the controller is comprised of two programmable timing circuits, 256 and 262, respectively. The first timing circuit, the fixed off-time circuit 256, is used to produce the fixed off time signal for the Fixed Off-Time mode, which delivers power in the standby mode. The fixed off-time circuit includes a current mirror 264, a ramp generator 266, and a comparator 268. Programming of the fixed off time may be accomplished with an external resistive load and capacitive load. $T_{OFF}C_{SET}$ 270 is a current output formed by a capacitive load. The voltage developed on this capacitive load is used to set the off time for the controller in the Fixed Off-Time mode of operation. $T_{OFF}R_{SET}$ 272 is a voltage output formed by a resistive load. The current flowing through this resistive load is used to program the charging current for the off-time timing circuit.

The second timing circuit 262 generates the voltage ramp signal that the controller uses to perform the pulse width modulation function. This ramp generator timing circuit 262 includes a current mirror 274, a ramp generator 276, a transistor switch 278, and a fixed voltage comparator 280. Two ramp times may be programmed with two external resistors, 282 and 284, and an external capacitor 286. $T_{ON}C_{SET}$ 286 is a current output formed by a capacitive load. The voltage developed on this capacitive load forms the voltage ramp signal supplied to the MD-&-PWM functional element. $T_{ON}$LowSet 282 is a voltage output formed by a resistive load. The current flowing through this resistive load is used to program the charging current needed to create the voltage ramp signal utilized by the MD-&-PWM functional element. $T_{ON}$HighSet 284 is a current output formed by a resistive load. The current flowing through this resistive load is used to modify the voltage ramp charging circuit used to perform pulse width modulation.

In addition, LINE 288 is a voltage sense signal used to indicate a high line condition that activates the transistor switch 287 used to change the voltage ramp charging circuit for pulse width modulation. The current mirror of each timing circuit is supplied with the power input to the controller $V_{CC}$ 236 and the internally-generated, temperature-stable voltage reference $V_{REF}$ 222.

The fourth functional element 290 of the controller processes catastrophic functions such as the Over-Voltage and Over-Current conditions. This Catastrophic-Detection element 290 performs simple voltage comparisons that are used to determine whether to shut off the output of the controller and force the controller to restart. For example, a comparison of the Over-Current-Voltage-Sense input voltage (VOCP 292) and the internally generated Voltage-Over-Current reference (VOC 226) is utilized to indicate an Over-Current condition of the primary switch current. Output of the Catastrophic-Detection element 290 is fed to the reset input of SR flip-flop 238 through a second OR gate 257 of the MD-&-PWM functional element. Detection of an Over-Current condition or other catastrophic events causes the controller to disable output power delivery.

It is to be understood that the invention is not limited to the illustrated and described forms of the invention contained herein. It will be apparent to those skilled in the art that various changes may be made without departing from the scope of the invention and the invention is not considered limited to what is shown in the exemplary figures and described in the specification.

What is claimed is:

1. A power factor correction controller for regulating a voltage, comprising:
    a reference and bias generator operable to provide threshold voltaic references and biases;
    a delay timer operable to generate a fixed off-time delay;
    a ramp timer operable to generate a voltage ramp signal; and
    a mode detector and modulator operable to determine from said threshold voltage references and biases whether to modulate said voltage based on said delay timer or said ramp timer and to modulate said voltage.

2. The power factor correction controller of claim 1 further comprising:
    a catastrophic detector operable to inhibit said mode detector and modulator in response to threshold conditions.

3. The power factor correction controller of claim 1 wherein said reference and bias generator includes:
    a generator for generating a temperature stable voltage reference; and
    a comparator with built in hysteresis for generating an under-voltage lock-out signal.

4. The power factor correction controller of claim 1 wherein said reference and bias generator is operative to generate a voltage reference and a reset signal.

5. The power factor correction controller of claim 1 wherein said mode detector and modulator comprises:
    an error amplifier for producing an error signal representing said voltage to be regulated;
    a comparator for comparing said error signal to said voltage ramp signal to produce an output having a pulse width; and
    a means for varying said output pulse width of said comparator to vary power delivered by said controller.

6. The power factor correction controller of claim 1 wherein said delay timer includes:
    a delay timing resistive load for programming a charging current for said ramp timer; and
    a delay timing capacitive load for programming an off-time for said power factor correction controller.

7. The power factor correction controller of claim 1 wherein said ramp timer includes:
    a first ramp timing resistive load for programming a charging current for said voltage ramp signal of said ramp timer;
    a ramp timing capacitive load for programming said voltage ramp signal for said ramp timer;
    a second ramp timing resistive load for programming a modified charging current for said voltage ramp signal of said ramp timer; and
    a transistor switch for modifying said ramp timing means to utilize said modified charging current upon the detection of a threshold condition.

8. A method of operating a power supply controller, said method comprising the steps of:
    providing a voltage reference and bias to said controller;
    when said voltage reference and bias begins to be provided, operating said controller in a fixed off-time mode of operation;
    responsive to a zero voltage switching condition and an absence of an over voltage condition, switching said controller from operating in said fixed off-time mode of operation to operating in a zero voltage switching mode of operation;

responsive to a signal selected from the group consisting of an over voltage condition signal, a fixed off-time mode of operation signal, and a signal indicating an absence of a zero voltage switching condition, switching said controller from operating in said zero voltage switching mode of operation to operating in said fixed off-time mode of operation;

responsive to an over current condition, operating said controller in an inhibit state wherein said voltage reference and bias is not provided and power delivery is disabled; and responsive to an input voltage falling below a threshold voltage while in said inhibit state, again providing said voltage reference and bias to said controller.

9. The method of claim 8, wherein said step of providing a voltage reference and bias to said controller includes the steps of:

providing a temperature stable voltage reference;

providing a voltage bias signal; and generating an under-voltage lock-out signal.

10. The method of claim 8, wherein said step of operating said controller in a fixed off-time mode of operation includes the step of:

modulating the pulse width of an output according to a frequency determined by an oscillation frequency of an off time circuit.

11. The method of claim 8, wherein said step of operating said controller in a zero voltage switching mode of operation includes the step of:

modulating the pulse width of an output according to a frequency determined by a resonant oscillation that indicates that all energy in a transformer has been discharged into a load.

12. A method of operating a controller to supply power from a power supply with power factor correction, the method comprising the steps of:

generating an error signal from a feedback signal and a voltage reference signal;

comparing said error signal to a voltage ramp signal to modulate an output at a frequency;

wherein said frequency of modulation is determined by an oscillation frequency of an off time circuit when a signal selected from the group consisting of an over voltage condition signal and a fixed off time mode signal is detected;

wherein said frequency of modulation is determined by a resonant oscillation that indicates that all energy in a transformer has been discharged into a load when said over voltage condition signal and said fixed off time mode signal are not detected.

* * * * *